(12) United States Patent
Wiktor et al.

(10) Patent No.: US 6,815,936 B2
(45) Date of Patent: Nov. 9, 2004

(54) CLOSED LOOP DIODE EMULATOR FOR DC-DC CONVERTER

(75) Inventors: Stefan Wlodzimierz Wiktor, Raleigh, NC (US); Xuening Li, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 198 days.

(21) Appl. No.: 10/225,269

(22) Filed: Aug. 21, 2002

(65) Prior Publication Data

US 2004/0036459 A1 Feb. 26, 2004

(51) Int. Cl.[7] .................................................. G05F 1/40
(52) U.S. Cl. ........................ 323/282; 323/283; 323/284
(58) Field of Search ................................ 323/222, 225, 323/282, 283, 284, 285, 288

(56) References Cited

U.S. PATENT DOCUMENTS

| | | | |
|---|---|---|---|
| 6,055,170 A | 4/2000 | Yee | ............................ 363/8 D |
| 6,316,926 B1 * | 11/2001 | Savo et al. | .................. 323/282 |
| 6,369,557 B1 * | 4/2002 | Agiman | ...................... 323/282 |
| 6,498,466 B1 * | 12/2002 | Edwards | ...................... 323/282 |

OTHER PUBLICATIONS

U.S. Patent Publication No. US 2002/01053C9A1, Ritter et al., Synchronous DC–DC Converter, Appl Serial. No. 10/067,046, filed Feb. 4, 2002.

* cited by examiner

*Primary Examiner*—Jessica Han
(74) *Attorney, Agent, or Firm*—Allen, Dyer, Doppelt, Milbrath & Gilchrist, P.A.

(57) ABSTRACT

A diode emulator for a DC—DC buck converter employs a variable current ramp-based circuit that monitors the state of the phase voltage at the common node between two power switching devices. Incrementally with each pulse width modulation cycle, the diode emulator adjusts the time of turn-off of the lower power switching device, until the monitored phase voltage indicates that the emulator is effectively tracking the negative going, zero-crossing of the ripple current through an output inductor.

16 Claims, 3 Drawing Sheets

CLOSED LOOP DIODE EMULATOR FOR DC-DC CONVERTER

FIELD OF THE INVENTION

The present invention relates in general to power supply circuits and components therefor, and is particularly directed to a diode emulator for a DC—DC converter in Discontinuous Conduction Mode (DCM). Prior to each PWM cycle, a tristate pulse (TriState, both switching devices are in the off state) is applied and the phase voltage polarity is sensed. The TriState pulse width is set by a closed loop circuit, and thereby incrementally adjusting the turn-off time of the commutating device according to the polarity of the phase voltage. As a result, it will effectively track the negative going, zero-crossing of the ripple current through the inductor and thereby effectively minimize loss of efficiency.

BACKGROUND OF THE INVENTION

FIG. 1 diagrammatically illustrates the general circuit configuration of a conventional DC—DC voltage buck converter as comprising a DC—DC controller 10, which switchably controls the turn-on and turn-off of a pair of electronic power switching devices, respectively shown as an upper FET (P-MOSFET or N-MOSFET) device 20 and a lower FET (N-MOSFET) device 30. These MOSFET switching devices have their drain-source paths coupled in series between first and second reference voltages (Vdd and ground (GND)). A common or phase voltage node 25 between the two power FETs 20/30 is coupled through an inductor 40 (which may typically comprise a transformer winding) to a capacitor 50 coupled to a reference voltage terminal (GND). The connection 45 between the inductor 40 and the capacitor 50 serves as an output node from which an output voltage Vout is derived.

The buck converter's DC—DC controller 10 includes a gate driver circuit 11, that is operative to controllably turn the two switching devices 20 and 30 on and off, in accordance with a pulse width modulation (PWM) switching waveform (such as that shown at PWM in the timing diagram of FIG. 2) generated by a PWM logic circuit 12. The upper FET device 20 is turned on and off by an upper gate switching signal UG applied by the gate driver 11 to the gate of the upper FET device 20, and the lower FET device 30 is turned on and off by a lower gate switching signal LG applied by the gate driver 11 to the gate of the lower FET device 30.

For the case of timing diagram of FIG. 2, the upper FET 20 is turned on in accordance with the rising edge of the PWM waveform and turned off in accordance with the falling edge of the PWM waveform, whereas the lower NFET 30 is turned on in accordance with the falling edge of the PWM waveform. During relatively light load conditions, where the ripple current IL through the inductor 40 is larger than the average inductor current, it is desired to revert to a basic DC—DC converter. This is effected by effectively replacing the lower switching FET 30 with a diode function—optimally turning off the lower switching device coincident with the negative-going zero-crossing of the inductor ripple current IL, so as to prevent current return flow back into the converter, and maximizing efficiency.

Prior art techniques to accomplish this diode transition operation may sense the ripple current flowing through the inductor 40 via node 45, or may sense the phase voltage at node 25 and couple the sensed variation to a comparator. FIG. 1 shows the example where the phase node voltage Vp is coupled to a comparator 13. Ideally, the comparator, which is enabled by the PWM logic circuit, will provide an output coincident with the negative-going, zero-crossing of the ripple current, in response to which the controller's output driver turns off the lower NFET switch.

Unfortunately, this technique is successful only at relatively low PWM frequencies, due to the propagation delay through the comparator. To obtain reasonably acceptable performance at relatively high PWM frequencies (e.g., on the order of 1 MHZ and above), it is necessary to use a comparator that requires a large current, which increases cost and is not practical for low power applications.

SUMMARY OF THE INVENTION

In accordance with the present invention, shortcomings of DC—DC buck converter diode emulators, including those described above, are effectively obviated by means of a variable current ramp-based diode emulator, that monitors the state of the phase voltage at the common node between the two switching devices and, incrementally with each PWM cycle, adjusts the turn-off time of the lower FET, until the monitored phase voltage indicates that the emulator is effectively tracking the negative going, zero-crossing of the ripple current through the inductor.

For this purpose, the diode emulator includes a phase voltage sample circuit that is coupled to receive a tristate pulse signal and a phase voltage signal. The tristate pulse signal starts just after turning-off the lower FET and prior to the front edge of the PWM pulse signal and terminates at the start of the PWM pulse. The phase voltage is derived from the common node between the two FETs. The rate at which the phase voltage Vp changes during the interval of the tristate pulse depends upon the properties of the FETs and inductor current. Due to the inherent body diode properties of the upper and lower FET switches and the properties of the inductor, the phase voltage will have a relatively positive edge at the tristate pulse if the lower FET is turned off too late. If the lower FET is turned off too early, however, the phase voltage remains low, being sensed as a second logical state.

The sensed phase voltage sample is coupled to the data input of a multibit up/down counter, which is sequentially clocked by the PWM signal. The up/down counter is used to control the rate of discharge of a lower power FET turn-off control capacitor, and thereby the time of occurrence of a turn-off signal for the lower FET, based upon whether the lower FET was turned-off too early or too late during the previous PWM cycle.

At each PWM pulse, the contents of up/down counter are either incremented or decremented, depending on the state of phase voltage as sampled/sensed by the TriState pulse. For a first binary state of the sensed phase voltage, indicating that in the previous cycle the lower power FET was turned off too late, the contents of the up/down counter will be 'incremented' by one bit at the next PWM pulse. For a second binary state of the sense phase voltage, indicating that in the previous cycle the lower power FET was turned off too early, the contents of the up/down counter are 'decremented' by one bit at the next PWM pulse.

The digital outputs of the up/down counter are coupled to relay drive inputs of relay coils of a set of relay switches. The switch contacts of the relay switches are coupled between to a charge/discharge node of the lower power FET turn-off control capacitor and outputs of a multiport current mirror. The current mirror has a further output coupled to the charge/discharge node of the lower power FET turn-off control capacitor, and is configured such that the currents at its output ports are binarily weighted in accordance with preselected weighting ratios relative to a reference input current.

This selective weighting of the mirror's output currents is defined in accordance with a prescribed capacitor discharge transfer function and serves to provide an adjustable (variable slope) ramp signal to a first input of a digital comparator. A second input of the digital comparator is coupled to receive the voltage VREF (308 in FIG. 3). The output of the digital comparator is coupled via a flip-flop to an output port, from which the lower FET turn-off signal is supplied to the controller.

In response to the tristate pulse signal, the phase voltage sample circuit senses the state of the phase voltage. As pointed out above, the phase voltage will produce a relatively high positive edge if the lower NFET is turned off too late, whereas if the lower NFET is turned off too early, the phase voltage will remain low. The sensed 'digital' state of the phase voltage is coupled to the up/down counter. At the next PWM pulse which begins at the termination of the tristate pulse, the contents of the up/down counter will be either incremented or decremented depending upon the state of the sensed phase voltage.

When a PWM pulse cycle begins, with the PWM being high, the lower power FET turn-off control capacitor will have been charged to a prescribed voltage. At the moment of the lower power FET turns on, the capacitor-charging switch is opened by the PWM pulse, so that the capacitor is no longer being charged. Also, the other relay switches are selectively closed in accordance with the contents of the up/down counter, so that the capacitor will discharge through one or more paths, as defined by the states of relay switches, with the magnitude of the resulting ramp current depending upon the binary weighting ratio of its associated current mirror output port of the multiport current mirror.

During its discharge into the current mirror, the lower power FET turn-off control capacitor will present to the first input of the digital comparator a voltage that decreases from an initial value and eventually drops below that applied to the second input of the digital comparator. When this happens, the output of the digital comparator change states, producing the lower power FET turn-off signal Toff that is supplied to the controller. For successive PWM cycles, as long as the value of phase voltage Vp is positive—indicating that the lower power FET was turned off too late in the previous cycle, the contents of the up/down counter will be continue to incremented. Then, in response to the sensed phase voltage no longer being positive—indicating that the lower power FET was turned off too early in the previous cycle, the up/down counter will be decremented.

Thus, the controlled, phase voltage-based incrementing and decrementing of the up/down counter presents a variable ramp current to the digital comparator, so that as the ramp current is varied over successive cycles of the PWM signal, it eventually attains a 'dithered' convergence of the lower power FET's turn-off signal Toff, that enables the emulator to very closely track the negative going, zero-crossing of the ripple current through the inductor, and thereby effectively minimize loss of efficiency of the converter.

DETAILED DESCRIPTION

Figure 3:
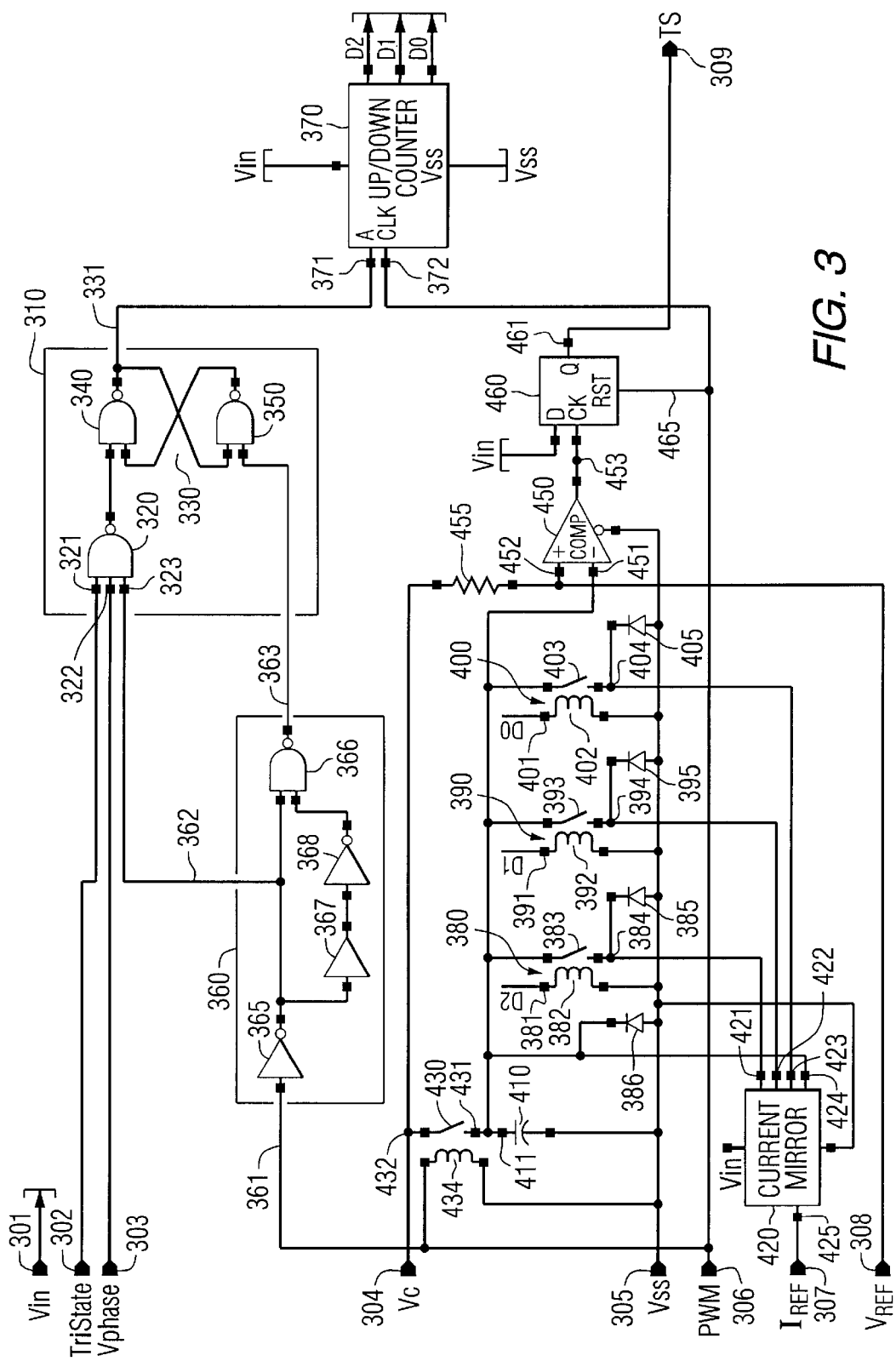
FIG. 3 is a logic—circuit diagram of the adjustable current ramp-based diode emulator in accordance with the present invention.

Attention is now directed to FIG. 3, which is a logic—circuit diagram of the adjustable current ramp-based diode emulator in accordance with the present invention. The diode emulator has a first input port 301 to which a DC input voltage Vin is coupled and a DC power terminal 305 to which a DC voltage Vss is applied. These DC voltages are distributed throughout the circuit for powering the various components of the emulator. An input port 302 is coupled to receive a tristate pulse signal (shown at TriState in the timing diagram of FIG. 4), which is generated just after turning-off the lower FET and prior to the start (rising edge) of the PWM pulse signal coupled to input port 306, and terminates at the start of the PWM pulse. As described briefly above and as will be detailed below, the tristate pulse is employed to sample the phase voltage Vp, just after the lower FET turning-off.

Figure 1:
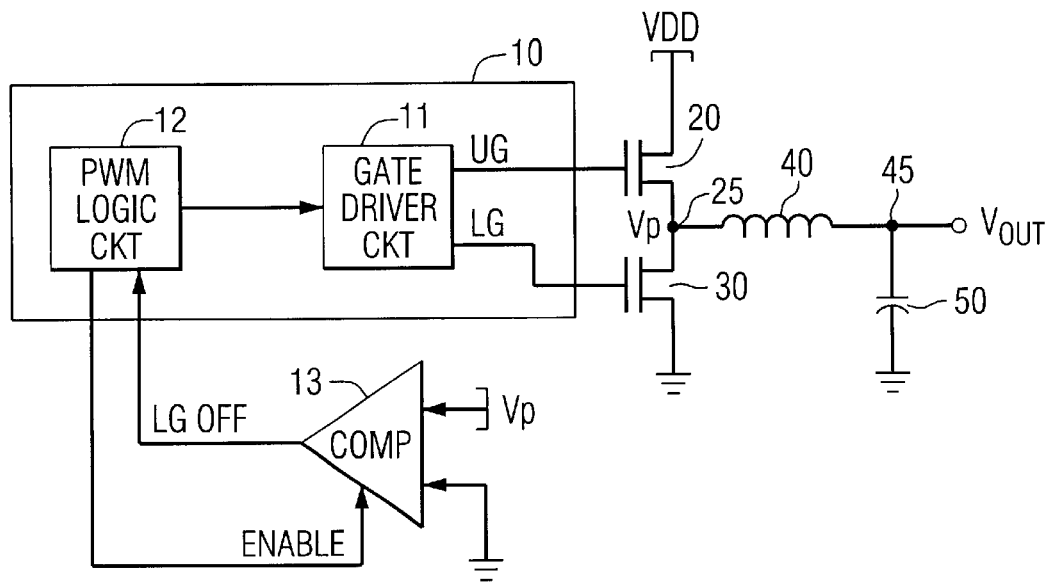
FIG. 1 diagrammatically illustrates the general circuit configuration of a conventional DC—DC voltage buck converter.

The tristate pulse TriState and a further phase voltage Vphase (or Vp), which is coupled to input port 303, are applied to respective inputs 321 and 322 of a NAND gate 320 within a phase voltage sample and hold circuit 310. The phase voltage signal Vp is derived from the common node 25 between the two FETs 20/30 shown in FIG. 1. A prescribed logic state (e.g., the high state) of the tristate pulse TriState serves to enable the NAND gate 320, so that it may sense the state of the Vp input 303.

Figure 4:
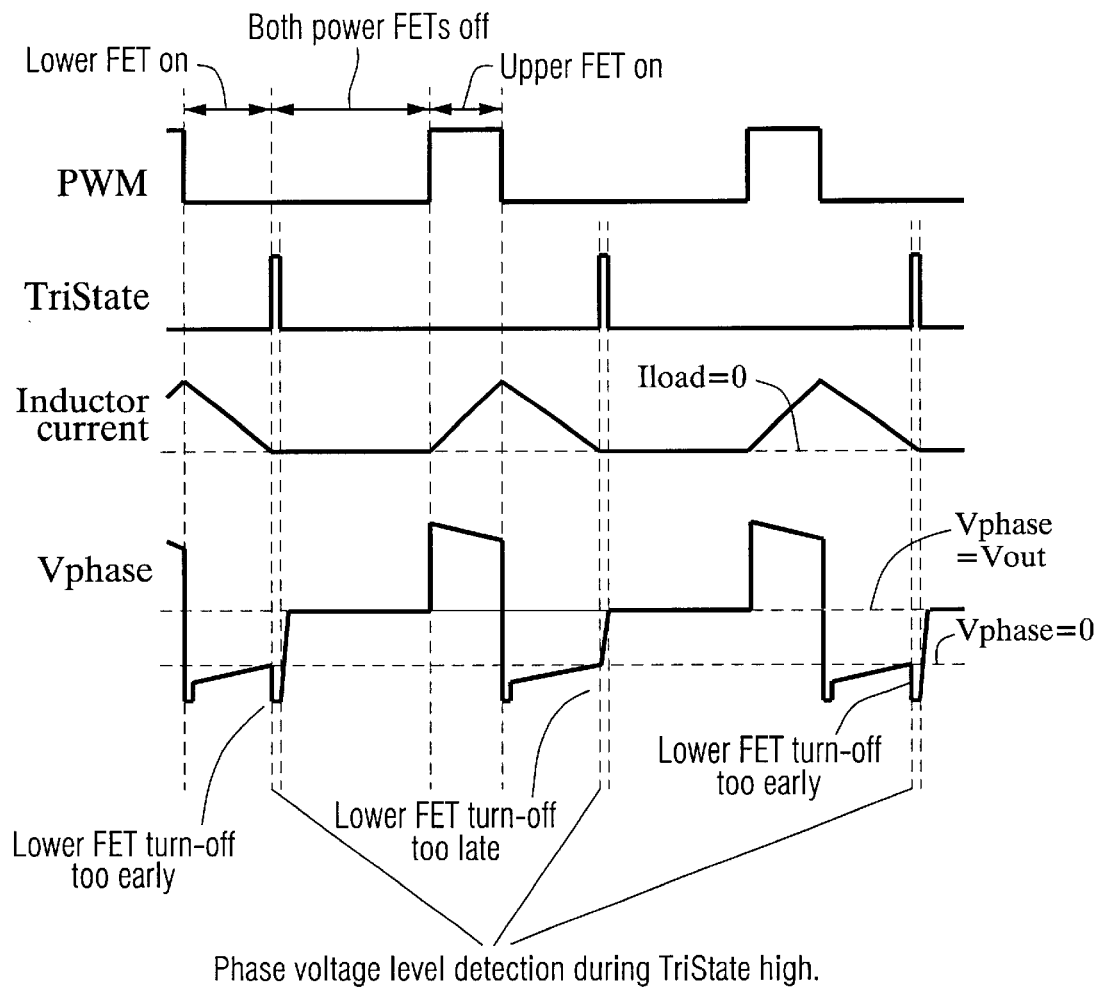
FIG. 4 is a timing diagram associated with the operation of the diode emulator of FIG. 3.

Due to the inherent (body diode) properties of the upper and lower FET switches and the properties of the inductor, the phase voltage Vp will produce a relatively positive edge, as shown at Vphase in the timing diagram of FIG. 4, if the lower power FET is turned off too late. This positive edge is sensed as a logical high or '1' state. On the other hand, if the lower NFET is turned off too early, the phase voltage will remain low, being sensed as a logical low or '0' state.

The phase voltage sample and hold circuit 310 is comprised of a cascaded connection of NAND gate 320 and a flip-flop 330 (comprised of cross-coupled NAND gates 340 and 350). NAND gate 320 has a third input 323 coupled to a first reset output 362 of a RESET circuit 360. A second reset output 363 of RESET circuit 360 is coupled as a reset input to NAND gate 350 of flip-flop 330.

The RESET circuit 360 is comprised of combinational logic circuitry including an inverter 365, having an input coupled to the PWM input port 306, and its output coupled to first reset output 362 and to a NAND gate 366. The output of inverter 365 is further coupled through serial-coupled inverters 367 and 368 to NAND gate 366. The output of NAND gate 366 provides the second reset output 363 that resets flip-flop 330. Within the phase voltage sample and hold circuit 310, NAND gate 320 is enabled on the falling edge of the PWM pulse, and disabled on its rising edge, while flip-flop 330 is reset on the falling edge of the PWM pulse. Flip-flop 330 has its Q output 331 coupled to a state (A) input 371 of a multibit up/down counter 370.

Figure 2:
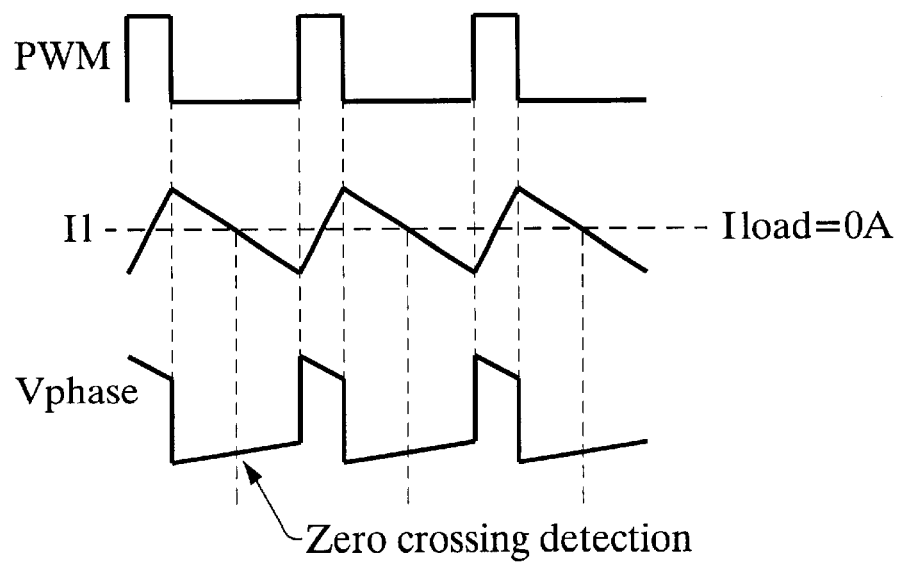
FIG. 2 is a timing diagram associated with the operation of the DC—DC voltage buck converter of FIG. 1.

The up/down counter 370 has its clock (CLK) input 372 coupled to the PWM input port 306. In the non-limiting example of FIG. 2, up/down counter 370 is shown as comprising a three bit (eight state) counter having respective D2 (MSB), D1 and D0 (LSB) outputs 375, 376 and 377. However, it should be observed that counter 370 is not limited to this or any particular code resolution. The contents of the up/down counter 370 are used to control the rate of discharge of a 'lower power FET turn-off control' capacitor 410, and thereby the time of occurrence of a turn-off signal for the lower power FET, based upon whether the lower power NFET was turned-off too early or too late during the previous PWM cycle.

To this end, at each PWM pulse, the contents of up/down counter 370 are either incremented or decremented, depending on the state of input 371, which represents the output of phase voltage sample and hold circuit 310. For a first binary state of input 371 (e.g., a value of 1, as may be associated with a relatively high or positive value of the sensed phase voltage indicating that in the previous cycle the lower power NFET was turned off too late), the contents of up/down counter 370 will be 'incremented' by one bit at the next PWM pulse. For a second binary state of the up/down counter's input 371 (e.g., a value of 0, as may be associated with a negative value of sensed phase voltage—indicating that in the previous cycle the lower power NFET was turned off too early), the contents of the up/down counter 370 will be decremented by one bit at the next PWM pulse.

The respective D2, D1 and D0 outputs 375, 376 and 377 of up/down counter 370 are coupled to relay drive inputs 381, 391 and 401 of relay coils 382, 392 and 402 of a set of relay switches 380, 390 and 400. Second ends of each of the relay coils are referenced to the voltage Vss applied to DC terminal 305. Associated with the relay coils 382, 392 and 402 of relay switches 380, 390 and 400 are respective switch contacts 383, 393 and 403, first ends of which are coupled to charge/discharge node 411 of capacitor 410.

As will be described, for each cycle of the PWM pulse, the capacitor 410 is initially charged (via a switch 430) to a prescribed voltage (e.g., 1.5 VDC). Then, during the PWM pulse low state and with the lower power FET turned on, the capacitor 410 is selectively discharged through one or more paths including switches 380, 390 and 400, in accordance with the states of the relay drive inputs 381, 391 and 401 of relay coils 382, 392 and 402 as defined by the respective D2, D1 and D0 outputs 375, 376 and 377 of the up/down counter 370.

Switch contacts 383, 393 and 403 have second ends 384, 394 and 404 thereof respectively coupled through reverse blocking diodes 385, 395 and 405 to Vss and to respective output ports 421, 422 and 423 of a multiport current mirror 420. Current mirror 420 has a fourth output 424 coupled to the charge/discharge node 411 of capacitor 410, and a reference current input node 425 coupled to a reference current input port 307 to which a prescribed reference current Iref is supplied. Current mirror 420 is configured such that the output currents at its output ports 421–424 are binarily weighted in accordance with preselected weighting ratios relative to the input or reference current applied to port 307. This selective weighting of the mirror's output currents is defined in accordance with a prescribed capacitor discharge transfer function for the capacitor 410, and serves to provide a variable slope ramp signal which is coupled to a digital comparator 450.

The charge/discharge node 411 of capacitor 410 is coupled to a first end 431 of a switchable contact 432 of relay switch 430, and to a first (−) input 451 of digital comparator 450. A second end 433 of switchable contact 432 is coupled to a charging voltage reference port 304 and through a resistor 455 to a second (+) input 452 of comparator 450. It is also coupled to a reverse blocking diode 386 connected to Vss. The relay switch 430 has a relay coil 434 coupled between PWM port 306 and Vss port 305.

The output 453 of the digital comparator 450 assumes a first binary state (e.g., logical '0') as long as the voltage at its first (−) input 451 is greater the voltage at its second (+) input 452. However, when the voltage at its first (−) input 451 is not greater than the voltage at its second (+) input 452, the output 453 of digital comparator assumes a second binary state (e.g., logical '1'), which serves as an NFET turn-off control signal to the controller. Digital comparator 450 has its output 453 coupled to a D flip-flop 460. The Q output 461 of flip-flop 460 is coupled to an output port 309 from which a turn-off signal Toff is supplied to the controller. Flip-flop 460 has its reset input 465 coupled to receive the PWM pulse supplied to PWM port 306.

The diode emulator circuit of FIG. 3 operates as follows. In response to the TriState pulse, the signal TriState coupled to port 302 goes high, just (after turn off of the lower FET, and prior to turning-on the upper FET at the rising edge of the PWM pulse) applied to the PWM input port 306 (as shown in FIG. 4), NAND gate 320 is enabled, so that it may sense the state of the phase voltage node Vp input 303. The rate at which the phase voltage Vp changes during the interval of the tristate pulse depends upon the properties of the power devices and is defined in accordance with the inductor current by dVp/dt=I/C. As discussed above, the phase voltage Vp will produce a relatively high positive edge, as shown at Vphase in the timing diagram of FIG. 4, if the lower NFET is turned off too late. This positive edge is sensed as a logical high or '1' digital state of the phase voltage. If the lower NFET is turned off too early, the phase voltage will remain low, being sensed as a logical low or '0' digital state of the phase voltage. This sensed Vp state is coupled to flip-flop 330 and applied from its Q output to the A input 371 of the up/down counter 370.

At the next PWM pulse which, as shown in FIG. 4, begins at the termination of the tristate pulse Tristate, the contents of the up/down counter 370 will be either incremented or decremented depending upon the state of the A input 371 (the sensed phase voltage state). For a first binary state of input 371 (e.g., '1' indicating that in the previous cycle, the lower power FET was turned off too late), the contents of up/down counter 370 will be incremented one bit by the PWM pulse. For a second binary state of up/down counter input 371 (e.g., '0' indicating that in the previous cycle, the lower power FET was turned off too early), the contents of up/down counter 370 will be decremented one bit by the PWM pulse. The resultant count value as output by the respective D2, D1 and D0 outputs 375, 376 and 377 of the counter 370 now defines the states of the relay drive inputs 381, 391 and 401 of relay switches 380, 390 and 400.

For the previous PWM pulse cycle, capacitor 410 will have been charged via switch 430 to a prescribed voltage (e.g., 1.5 VDC). When the lower power FET turns on, the capacitor-charging relay switch 430 is opened by the PWM pulse, so that the capacitor 410 is no longer being charged. Also, relay switches 480, 490 and 400 are selectively closed in accordance with the respective D2, D1 and D0 outputs 375, 376 and 377 of the up/down counter 370. In addition to the current discharge path from node 411 to current mirror input 424, capacitor 410 may discharge through one or more additional paths, as defined by the states of relay switches 380, 390 and 400, and the magnitude of current through each path will depend upon the binary weighting ratio of its associated current mirror output port of current mirror 420, as described above.

As capacitor 410 is discharged into current mirror port 424 and to any of the current mirror ports 421-423 through whichever one or more relay switches 380, 390 and 400 have been closed in accordance with the respective D2, D1 and D0 outputs 375, 376 and 377 of the up/down counter 370, the voltage across capacitor 410 and applied to the first (−) input 451 of digital comparator 450 will decrease from its initial value (e.g., 1.5 VDC). Eventually, the voltage across capacitor 410 (and applied to comparator input 451) will drop below that applied through resistor 455 to the second (+) input 452 of comparator 450. When this happens the output 453 of the digital comparator 450 changes state, and produces the lower power FET turn-off signal Toff that is supplied to the controller at output port 309.

Thus for successive PWM cycles, as long as the value of phase voltage Vp is positive—indicating that the lower power FET was turned off too late in the previous cycle, the contents of the up/down counter 370 will be incremented (by one bit per PWM cycle). This continues until the value of the phase voltage is no longer detected as positive—indicating that the lower power FET was turned off too early in the previous cycle. At this point, the contents of up/down counter 370 will be decremented (by one bit). Should the next tristate pulse-based phase voltage measurement be positive, the contents of the up/down counter 370 will again be incremented by one bit, and so on.

It can be seen therefore, that this controlled, phase voltage-based incrementing and decrementing of the up/down counter 370 provides a variable ramp current input the comparator 450. As the ramp current is varied over successive cycles of the PWM signal, it eventually produces a dithered convergence of the lower power FET turn-off signal Toff that enables the emulator to very closely track the negative going, zero-crossing of the ripple current through the inductor and thereby effectively minimize loss of efficiency of the converter.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. For use with a DC—DC voltage converter, having a controller which generates a pulse width modulation (PWM) switching signal, that switchably controls operation of a switching circuit, containing first and second electronic power switching devices coupled between respective power supply terminals, and having a common node thereof coupled through an inductor element to an output voltage terminal and a capacitor element, a method of emulating diode operation of said switching circuit during off time of said PWM switching signal, said method comprising the steps of:

(a) during an interval other than a switch-on state of said PWM switching signal, sensing a state of a voltage at said common node;

(b) generating a switch off signal for turning off one of said first or second electronic power switching devices; and (c) over successive cycles of said PWM switching signal, adjusting the turn off time of said switch off signal in accordance with successively sensed states of said voltage at said common node.

2. The method according to claim 1, wherein step (c) comprises generating an analog ramp signal having a slope that is successively adjusted in accordance with said successively sensed states of said voltage at said common node, and defining the turn off time of said switch off signal in accordance with said analog ramp signal.

3. The method according to claim 2, wherein step (c) comprises, over successive cycles of said PWM switching signal, controllably modifying a count in accordance with said successively sensed states of said voltage at said common node, and for each cycle of said PWM switching signal, defining said slope of said analog ramp signal based on said count.

4. The method according to claim 3, wherein step (c) comprises, for a respective cycle of said PWM switching signal, charging a storage device to a prescribed voltage, and generating said ramp signal by controllably discharging said storage device through a multipath switching circuit, respective discharge paths through which are defined in accordance with said count.

5. The method according to claim 1, wherein said controller is operative to turn on said second electronic power switching device in accordance with a first switching state of said PWM switching signal, and to turn off said second electronic power switching device and turn on said first electronic power switching device in accordance with a second switching state of said PWM switching signal.

6. The method according to claim 1, wherein said DC—DC voltage converter comprises a boost DC—DC converter, and said diode operation of said switching circuit is applied to said boost DC—DC converter in discontinuous conduction mode, where one of said first and second electronic power switching devices emulates said diode operation, and wherein step (a) comprises sensing said state of said voltage at said common node during an off state of said first and second electronic power switching devices, and step (c) comprises incrementally adjusting the on-time of one of said first and second electronic power switching devices over said successive cycles of said PWM switching signal.

7. A diode emulator for a DC—DC voltage buck converter having a controller, which generates a pulse width modulation (PWM) switching signal that switchably controls operation of a switching circuit containing first and second electronic power switching devices coupled between respective power supply terminals, a common node thereof being coupled through an inductor element to an output voltage terminal and a capacitor, said diode emulator comprising:

a phase voltage sample and hold circuit that is operative to sense a state of a voltage at said common node during an interval other than a switch on state of said PWM switching signal; and a switch off signal control circuit, which is operative to generate a turn off signal for turning off said first electronic power switching device, and to adjust the turn off time of said switch off signal in accordance with successively sensed states of said voltage at said common node, as sensed by said phase voltage sample and hold circuit over successive cycles of said PWM switching signal.

8. The diode emulator according to claim 7, wherein said switch off signal control circuit is operative to generate an analog ramp signal having a slope that is successively adjusted in accordance with said successively sensed states of said voltage at said common node, the turn off time of said switch off signal being defined in accordance with said analog ramp signal.

9. The diode emulator according to claim 8, wherein said switch off signal control circuit includes a counter having its contents controllably modified in accordance with said states of said voltage at said common node as successively sensed by said phase voltage sample and hold circuit and wherein, for each cycle of said PWM switching signal, said switch off signal control circuit is operative to define said slope of said analog ramp signal in accordance said contents of said counter.

10. The diode emulator according to claim 9, wherein switch off signal control circuit includes a charge storage device, and is operative, for a respective cycle of said PWM switching signal, to charge said storage device to a prescribed voltage, and to generate said ramp signal by controllably discharging said storage device through a multipath switching circuit, respective discharge paths through which are based on said contents of said counter.

11. The diode emulator according to claim 7, wherein said controller is operative to turn on said second electronic power switching device in accordance with a first switching state of said PWM switching signal, and to turn off said second electronic power switching device and turn on said first electronic power switching device in accordance with a second switching state of said PWM switching signal.

12. A diode emulator for a DC—DC voltage buck converter having a controller, which generates a pulse width modulation (PWM) switching signal that switchably controls operation of a switching circuit containing first and second electronic power switching devices coupled between respective power supply terminals, a common node thereof being coupled through an inductor element to an output voltage terminal and a capacitor, said diode emulator comprising:

a phase voltage sample and hold circuit that is operative to generate a representation of phase voltage at said common node during an off interval of said PWM switching signal; and a switch off signal control circuit, which is operative to incrementally adjust the time of turn-off of one of said first and second electronic power switching devices, with each PWM switching signal cycle, until said representation of said phase voltage indicates that the emulator is effectively tracking a zero-crossing of the ripple current through the inductor.

13. The diode emulator according to claim 12, wherein said phase voltage sample and hold circuit is enabled by a tristate pulse signal, which starts just after turning said second electronic power switching device off, and prior to the start of said PWM switching signal and terminates at the start of said PWM switching signal.

14. The diode emulator according to claim 13, wherein said switch off signal control circuit includes an up/down counter, the contents of which are controllably modified in accordance with respective ones of said representation of phase voltage at said common node for successive PWM switching signal cycles, said up/down counter controlling the rate of discharge of a capacitor and thereby the time of turn-off of said one of said first and second electronic power switching devices, in dependence upon whether said one of said first and second electronic power switching devices was turned-off too early or too late during the previous PWM switching signal cycle.

15. The diode emulator according to claim 14, wherein said switch off signal control circuit includes a switchably controlled multipath capacitor discharge circuit coupled with a multiport current mirror, and wherein contents of said up/down counter are coupled to selectively enable respective paths through said switchably controlled multipath capacitor discharge circuit.

16. The diode emulator according to claim 15, wherein said multiport current mirror is configured such that the currents at its output ports are binarily weighted in accordance with preselected weighting ratios relative to a reference input current, in association with a prescribed capacitor discharge transfer function that provides an adjustable ramp signal to comparator, said comparator having an output used to turn off said one of said first and second electronic power switching devices.

\* \* \* \* \*